United States Patent
Shah

(10) Patent No.: US 6,813,240 B1
(45) Date of Patent: Nov. 2, 2004

(54) METHOD OF IDENTIFYING LOW QUALITY LINKS IN A TELECOMMUNICATIONS NETWORK

(75) Inventor: Jasvantrai C. Shah, Richardson, TX (US)

(73) Assignee: MCI, Inc., Ashburn, VA (US)

( * ) Notice: Subject to any disclaimer, the term of this patent is extended or adjusted under 35 U.S.C. 154(b) by 0 days.

(21) Appl. No.: 09/330,436

(22) Filed: Jun. 11, 1999

(51) Int. Cl.⁷ .............................................. H04L 12/26
(52) U.S. Cl. ....................................... 370/228; 370/248
(58) Field of Search ................................ 370/216, 217, 370/221, 222, 225, 227, 228, 242, 248, 244

(56) References Cited

U.S. PATENT DOCUMENTS

| | | |
|---|---|---|
| 4,466,060 A | 8/1984 | Riddle |
| 4,648,088 A | 3/1987 | Cagle et al. |
| 4,825,206 A | 4/1989 | Brice, Jr. et al. |
| 4,853,927 A | 8/1989 | Wenzel |
| 4,884,263 A | 11/1989 | Suzuki |
| 4,941,089 A | 7/1990 | Fischer |
| 4,956,835 A | 9/1990 | Grover |
| 5,070,497 A | 12/1991 | Kleine-Altekamp |
| 5,146,452 A | 9/1992 | Pekarske |
| 5,173,689 A | 12/1992 | Kusano |
| 5,189,662 A | 2/1993 | Kleine-Altekamp |
| 5,212,475 A | 5/1993 | Thoma |
| 5,218,601 A | 6/1993 | Chujo et al. |
| 5,233,600 A | 8/1993 | Pekarske |
| 5,235,599 A * | 8/1993 | Nishimura et al. ............ 714/4 |
| 5,241,534 A * | 8/1993 | Omuro et al. |
| 5,253,248 A | 10/1993 | Dravida et al. |
| 5,319,632 A | 6/1994 | Iwasaki |
| 5,325,366 A | 6/1994 | Shinbashi |
| 5,435,003 A | 7/1995 | Chng et al. |
| 5,455,832 A | 10/1995 | Bowmaster |

(List continued on next page.)

FOREIGN PATENT DOCUMENTS

| | | |
|---|---|---|
| WO | 96/41440 | 12/1996 |
| WO | 97/48189 | 12/1997 |

OTHER PUBLICATIONS

Bouloutas et al. "Alarm Correlation and Fault Identification in Communication Networks"; 1994 IEEE Transactions and Communications.

Manione et al.; "An Inconsistencies Tolerant Approach in the Fault Design of Telecommunications Network"; Feb. 14, 1994.

*Primary Examiner*—Kwang Bin Yao

(57) ABSTRACT

In a telecommunications network provisioned with a path based distributed restoration algorithm, upon the detection of a failure in a link, each of the custodial nodes of the failed link sends a special message to the respective end nodes. These end nodes communicate with each other over a communications network independent of the telecommunications network and, in turn, inform the custodial nodes of the identity of the other custodial nodes. By providing each custodial node with the knowledge that its adjacent node is its opposing custodial node, any functional link that cross-connects the custodial nodes is deemed to be of poor quality and, therefore, should not be used as a part of an alternate path for rerouting the disrupted traffic, unless no other alternate path could be found.

19 Claims, 3 Drawing Sheets

U.S. PATENT DOCUMENTS

| | | | |
|---|---|---|---|
| 5,457,556 A | 10/1995 | Shiragaki | |
| 5,479,608 A | 12/1995 | Richardson | |
| 5,493,273 A | 2/1996 | Smurlo et al. | |
| 5,495,471 A | 2/1996 | Chow et al. | |
| 5,499,237 A | 3/1996 | Richetta et al. | |
| 5,537,532 A | 7/1996 | Chng et al. | |
| 5,548,639 A | 8/1996 | Ogura et al. | |
| 5,572,512 A | 11/1996 | Cutler et al. | |
| 5,581,689 A * | 12/1996 | Slominski et al. | 714/4 |
| 5,586,112 A | 12/1996 | Tabata | |
| 5,590,118 A | 12/1996 | Nederlof | |
| 5,590,119 A | 12/1996 | Moran et al. | |
| 5,598,403 A | 1/1997 | Tatsuki | |
| 5,623,481 A | 4/1997 | Russ et al. | |
| 5,636,203 A | 6/1997 | Shah | |
| 5,636,206 A | 6/1997 | Amemiya et al. | |
| 5,646,936 A | 7/1997 | Shah et al. | |
| 5,657,320 A | 8/1997 | Russ et al. | |
| 5,680,326 A | 10/1997 | Russ et al. | |
| 5,710,777 A | 1/1998 | Gawne | |
| 5,721,727 A | 2/1998 | Ashi et al. | |
| 5,734,687 A | 3/1998 | Kainulainen | |
| 5,748,611 A | 5/1998 | Allen et al. | |
| 5,748,617 A | 5/1998 | McLain, Jr. | |
| 5,757,774 A | 5/1998 | Oka | |
| 5,768,256 A | 6/1998 | Allen et al. | |
| 5,781,535 A | 7/1998 | Russ et al. | |
| 5,796,736 A | 8/1998 | Suzuki | |
| 5,802,144 A | 9/1998 | Laird et al. | |
| 5,812,524 A | 9/1998 | Moran et al. | |
| 5,832,196 A | 11/1998 | Croslin et al. | |
| 5,832,197 A * | 11/1998 | Houji | 714/4 |
| 5,838,660 A | 11/1998 | Croslin | |
| 5,841,759 A | 11/1998 | Russ et al. | |
| 5,850,505 A | 12/1998 | Grover et al. | |
| 5,852,600 A | 12/1998 | Russ | |
| 5,862,125 A | 1/1999 | Russ | |
| 5,862,362 A | 1/1999 | Somasegar et al. | |
| 5,867,689 A | 2/1999 | McLain, Jr. | |
| 5,875,172 A | 2/1999 | Tabata | |
| 5,914,798 A | 6/1999 | Liu | |
| 5,933,422 A | 8/1999 | Kusano et al. | |
| 5,943,314 A | 8/1999 | Croslin | |
| 5,986,783 A | 11/1999 | Sharma et al. | |
| 5,991,338 A | 11/1999 | Trommel | |
| 5,999,286 A | 12/1999 | Venkatesan | |
| 6,021,113 A | 2/2000 | Doshi et al. | |
| 6,026,073 A | 2/2000 | Brown et al. | |
| 6,026,077 A | 2/2000 | Iwata | |
| 6,041,049 A | 3/2000 | Brady | |
| 6,044,064 A | 3/2000 | Brimmage et al. | |
| 6,049,529 A | 4/2000 | Brimmage et al. | |
| 6,061,735 A | 5/2000 | Rogers | |
| 6,104,695 A | 8/2000 | Wesley et al. | |
| 6,108,309 A | 8/2000 | Cohoe et al. | |
| 6,130,875 A | 10/2000 | Doshi et al. | |
| 6,137,775 A | 10/2000 | Bartlett et al. | |
| 6,154,448 A | 11/2000 | Petersen et al. | |
| 6,167,025 A | 12/2000 | Hsing et al. | |
| 6,215,763 B1 | 4/2001 | Doshi et al. | |
| 6,222,821 B1 | 4/2001 | Sees et al. | |
| 6,278,689 B1 * | 8/2001 | Afferton et al. | 370/223 |
| 6,282,170 B1 * | 8/2001 | Bentall et al. | 370/225 |
| 6,324,162 B1 * | 11/2001 | Chaudhuri | |
| 6,337,846 B1 | 1/2002 | Bengston et al. | |
| 6,377,543 B1 | 4/2002 | Grover et al. | |
| 6,414,940 B1 | 7/2002 | Shah et al. | |
| 6,418,117 B1 | 7/2002 | Shah et al. | |
| 6,456,589 B1 | 9/2002 | Shah et al. | |
| 6,512,740 B1 | 1/2003 | Baniewicz et al. | |
| 2003/0133417 A1 | 7/2003 | Badt, Jr. | |

* cited by examiner

METHOD OF IDENTIFYING LOW QUALITY LINKS IN A TELECOMMUNICATIONS NETWORK

BACKGROUND

The present invention relates to a telecommunications network provisioned with a distributed restoration algorithm (DRA) and, more particularly, to ascertaining the quality of certain links cross-connecting adjacent nodes in the network.

In a telecommunications network provisioned with a distributed restoration algorithm (DRA), when a fault occurs at any one of the links of the network, the DRA algorithm within each node would try to find an alternate route that circumvents the failed link, or node, by using the spare links that interconnect the nodes of the network. Normally, to find an alternate path or paths, the DRA process first determines the availability of any spare links after the failure is detected. As spare links that form the alternate paths are found, all of those spare links are presumed to be equivalents in terms of their reliability.

When there is a failure, the DRA process has to act quickly, so as to minimize the disruption to the network. Accordingly, the DRA process usually does not have the time to monitor the integrity of the spare links for any length of time before the disrupted traffic is switched onto the available spare links that form the alternate route(s). As a consequence, some of the spare links that the DRA process selects may fail subsequent to the switch. Such subsequent failure is undesirable insofar as it compounds the disruptive effects of a failure.

Therefore, a method is required for a DRA process to readily identify any links that are seemingly intact but are susceptible to failure shortly after the restoration process, i.e., the switching of the disrupted traffic onto the spare link, is completed. By being able to identify those links that are susceptible to failure shortly after restoration, i.e., low quality links, the DRA process can make a better selection of the alternate paths for rerouting the disrupted traffic.

Some known methods are based partly on a determination of whether a spare link is part of a span where other links have failed. The assumption of these methods is that within a span where some links have failed, the failure of the remaining links is also likely. Such a characterization relies mostly upon identifying the custodial nodes adjacent a failed span so that any seemingly intact spare link(s) between the custodial nodes may be assigned a lower quality rating. Thus, each node in a network that has observed a failed link would emanate a message along all of the spare links. But there is no way for a node to know which spare links corresponds to a given working link. In other words, there is no communications means within the working links to allow for node identification. Thus, the message is sent out indiscriminately along all spare links rather than only the selected few where failure had actually occurred. Consequently, this technique gives rise to inefficiency in communication.

A method is therefore required for more reliably identifying low quality spare links and, more specifically, for identifying the particular pair of custodial nodes that are associated with each span failure so that the proper quality value may be assigned to those spare links associated with the failed span.

SUMMARY

When a portion of a path through a telecommunications network is interrupted due to a failure of the link(s) along the path, the failure is detected by the nodes on either side of the failure. The detecting nodes adjacent the failure, i.e., the custodial nodes, each independently output a special message towards the respective end nodes of the failed path. The special message includes, among other things, information about which portion, i.e. the links, of the failed path, remain functional or intact. This information is provided to the various nodes of the network using the functioning or intact links of the path.

When each end node of the failed path receives the special message, it extracts the identity of the custodial node from the route information portion of the message. Each end node, in turn, informs the other end node of the location of the custodial node from which the special message was received by means of a data communications network independent of the telecommunications network, such as a wide area network (WAN). Then the end nodes, collectively or individually, communicate over the independent communications network custodial node information to each custodial node of the failed link to inform that custodial node of the identity of the other custodial node. With each custodial node cognizant of its opposing custodial node, any failed link that cross-connects custodial nodes can be identified. The quality of such identified link is then presumed to be lower than those links that are not associated with both custodial nodes. This presumption is based on the fact that those functional links that cross-connect the custodial nodes of the failed link may very well be rendered non-functional shortly because whatever caused the failure to occur at the failed link will most likely also affect those remaining functional links.

An objective of the present invention is to eliminate the propagation of unnecessary "I am a custodial node" messages to the various nodes of the network by providing to each of the custodial nodes of a failed link the knowledge of which of its adjacent nodes is the other custodial node.

It is another objective of the present invention to readily determine the quality of the links interconnecting the nodes of the network by readily segregating those functional links that cross-connect the custodial nodes of a failed link from other functional links.

It is moreover another objective of the present invention to more accurately determine which spare links lie along a failed link and, more particularly, which functional links are associated with the failed link and should therefore be considered to be of lower quality.

DETAILED DESCRIPTION

Figure 1:
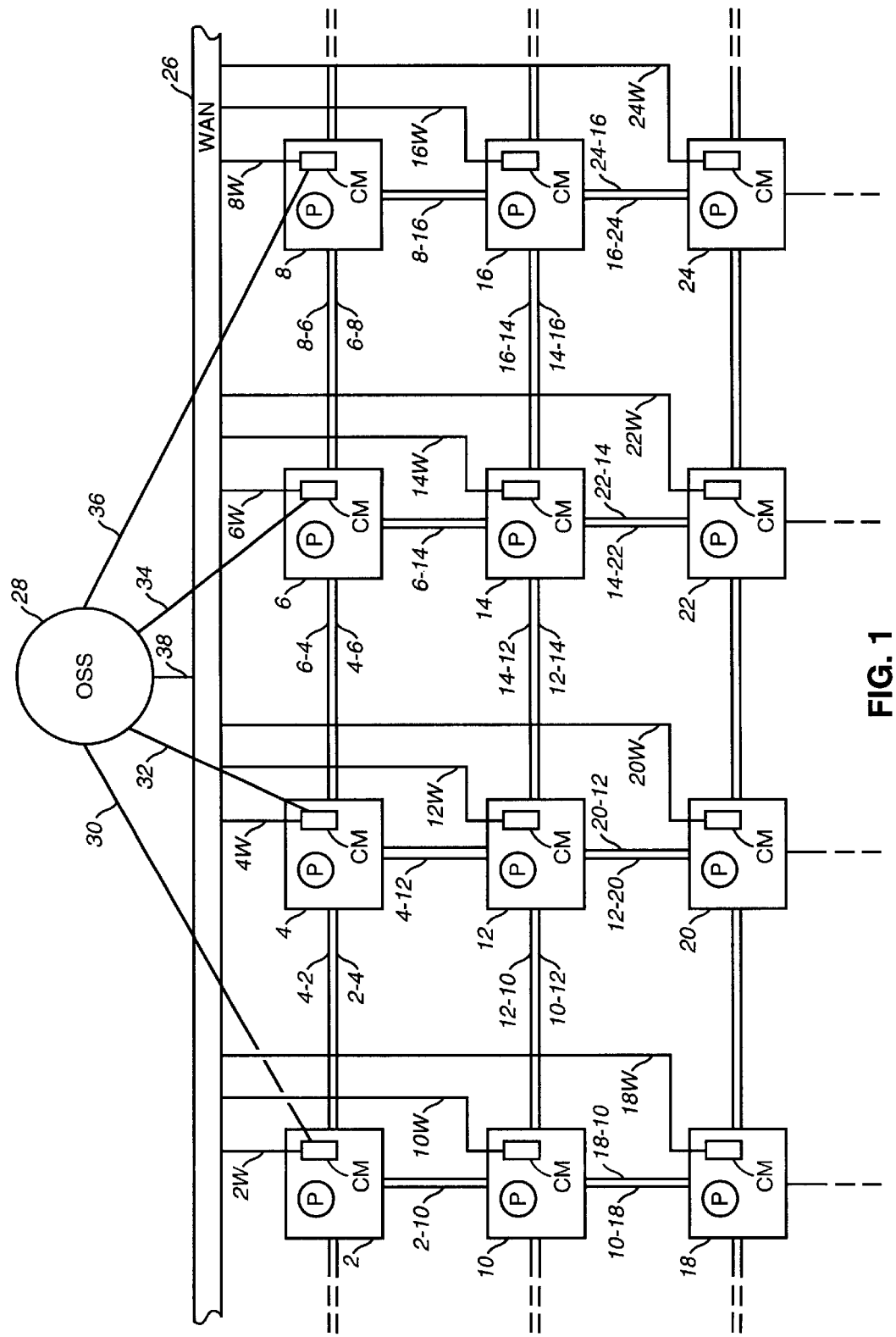
FIG. 1 is an illustration of a portion of an exemplar telecommunications network, an operations support system (OSS) connected to each of the nodes, and a communications network independent of the telecommunications network for providing an overall view of the instant invention.

A telecommunications network of the present invention, as partially shown in FIG. 1, includes a number of nodes 2-24 each cross-connected to adjacent nodes by respective links 24 and 4-2 between nodes 2 and 4, links 4-6 and 6-4 between nodes 4 and 6, and links 6-8 and 8-6 between nodes 6 and 8, etc. Although only two links are shown connecting any two nodes, it should be appreciated that various links can connect two nodes or various other nodes and links can be geographically at the same location. A collection of links coupled between any two nodes, for example node 2 and node 4, may be considered a span that includes working links and spare links. Although not shown in FIG. 1, it should be appreciated that adjacent nodes are cross-connected to each other by line terminal equipment (LTE).

As shown, each of the nodes includes its own processor P and a communications module (CM), such as a conventional communications board used in a digital cross-connect switch, such as the 1633-SX broad band cross-connect switch made by the Alcatel Network System Company. Each of the nodes is provisioned with a distributed restoration algorithm (DRA) so that if a fault or failure occurs anywhere in the telecommunications network, a distributed restoration process is initiated for restoring the traffic disrupted by the failure.

In addition to the telecommunications network that comprises the DRA provisioned nodes 2-24, there is further shown in FIG. 1 a conventional wide area network (WAN) 26, separated from and independent of the telecommunications network, to which the respective CMs of the nodes are connected. For example, the CM of node 2, referred to as CM2, is communicatively connected to WAN 26 by a line connection 2W. Likewise, CM4 is connected to WAN 26 per line 4W, CM6 to WAN 6 per line 6W, CM8 to WAN 26 per line 8W, etc. Thus connected, signals or messages from each of the nodes shown in FIG. 1 could be routed to any of the other nodes of the telecommunications network by means of WAN 26. Note that even though a WAN is disclosed herein as being the independent network of choice, other types of communication networks that utilize other modes of communications and/or data transport can be used.

Also shown in FIG. 1 is a central controller or an operations support system (OSS) 28, where the management of the network could monitor and possibly control the overall operation of the exemplar telecommunications network. The overall view, or map, of the layout and the operation of the respective nodes of the network are provided to OSS 28 by the respective communication connections that OSS 28 has with the respective nodes 2-24. For the sake of simplicity, only the connections that communicatively connect OSS 28 to nodes 2, 4, 6 and 8 are shown even though other nodes are connected to OSS 28. As illustrated, nodes 2, 4, 6 and 8 are communicatively connected to OSS 28 by lines 30, 32, 34 and 36, respectively. As further shown, the connections between OSS 28 and the respective nodes are by means of the respective CMs in each of those nodes. OSS 28 is further illustrated to be in communication with WAN 26 by means of a communications line 38. In co-pending application Ser. No. 09/148,944 ("the '944"), filed Sept. 8, 1998 entitled, "Restricted Reuse of Intact Portions of Failed Path", and assigned to the same assignee as the instant invention, a technique where a pair of nodes adjacent a failure can independently send a special message towards the respective end nodes of the path is disclosed. Such special message can convey, among other things, information about which fragment of the failed path may still be intact.

Another co-pending application Ser. No. 09/149,589 ("the '589"), filed Sept. 8, 1998 entitled, "Out of Band Messaging in a DRA Network", and assigned to the same assignee as instant invention, further discloses a method of providing data communication among all network nodes by using a communications network independent of the telecommunications network. The respective disclosures of the '944 and '589 applications are incorporated herein by reference.

Figure 2:
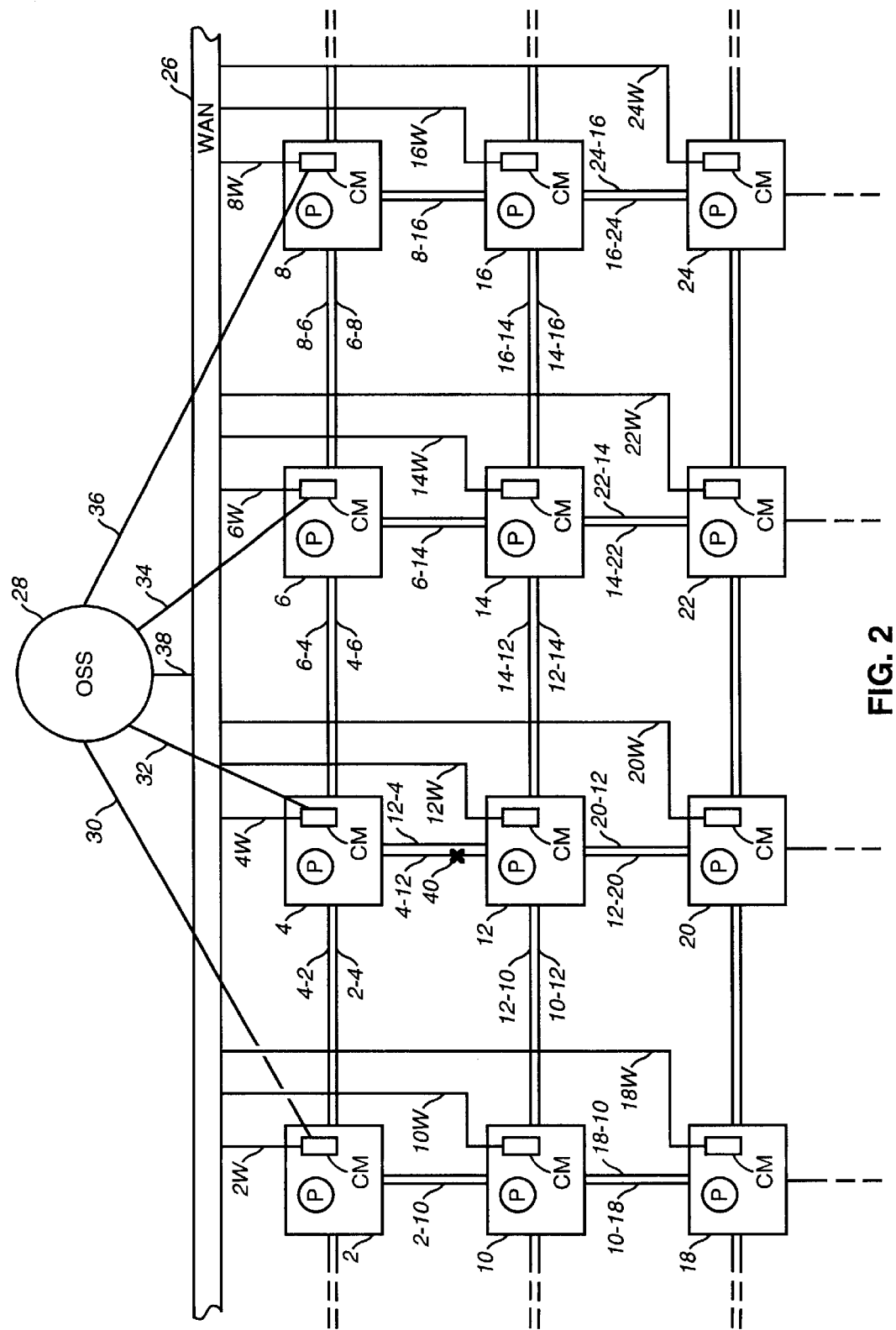
FIG. 2 is the network shown in FIG. 1 with some of the links being shown to have failed.

With reference to FIG. 2, assume that a path traversing across the exemplar telecommunications network of FIG. 2 comprises node 2, node 4, node 12, node 14, node 16, and node 8, as well as those links that cross-connect those nodes. The end nodes for path 24-12-14-16-8 are therefore nodes 2 and 8. When fault or failure, such as for example fault 40, occurs at the link 4-12, the traffic that traverses through the path defined by end nodes 2 and 8 is disrupted. The fault 40 may result from, for example, a cut of the fiber optics by a backhoe. In the case of the disruption of traffic between nodes 4 and 12, note that link 12-4 remains functional and, therefore, is capable of carrying data traffic between those nodes; only link 4-12 cross-connecting nodes 4 and 12 is faulty due to fault 40. For the example on hand, link 124 may be considered to be a spare link that could be used to reroute traffic.

Even though link 12-4 remains functional, this link is to be identified as a low quality link because it is located between the two custodial nodes, nodes 4 and 12, that sandwich the failed link 4-12. In order to identify the link 12-4 as a low quality link, each custodial node needs to be informed of its adjacent custodial node. Each custodial node propagates a message with information about the custodial node, as discussed below, toward one of end node using the intact portion of the failed path. Consequently, the end nodes are able to determine which node is the custodial node and exchange this information, through the WAN 26, with the other end node. Accordingly, each end node will have information about both of the custodial nodes. Thus, one or both of the end nodes can send information to each of the custodial nodes regarding adjacent custodial nodes using either the intact portion of the failed path or the WAN 26. For example, if only end node 2 is to used to provide information about adjacent nodes to custodial nodes 4 and 12, then end node 2 could communicate to custodial node 4 using the intact portion of the failed path and communicate to custodial node 12 using the WAN 26. Alternatively, end node 2 could communicate to both custodial node 4 and custodial node 12 using the WAN 26. On the other hand, both end node 2 and end node 8 could be used to communicate adjacent custodial node information to custodial node 4 and custodial node 12, respectively, using the intact portion of the failed link or the WAN 26. Alternatively, the end node 2 and the end node 8 can communicate to the custodial node 12 and the custodial node 4, respectively, using the WAN 26. Once node 4 and node 12 receive information about the identity of its opposing custodial node, then node 4 knows that its opposing custodial node is node 12 and node 12 knows that its opposing custodial node is node 4. With that knowledge and with each of nodes 4 and 12 recognizing that cross-connected link 124 is still functional, and further recognizing that there is a high likelihood that link 12-4 will become nonfunctional because the link 12-4 is associated with the link 4-12, each of nodes 4 and 12 will designate link 12-4 to be a low quality link. Thus designated, low quality link 12-4 will not be used for restoring any disrupted traffic, unless no other alternate path could be found. Given the layout of the exemplar telecommunications network shown in FIG. 2, the DRA provisioned nodes should easily find an alternate path between end nodes 2 and 8 without using link 12-4.

Figure 3:
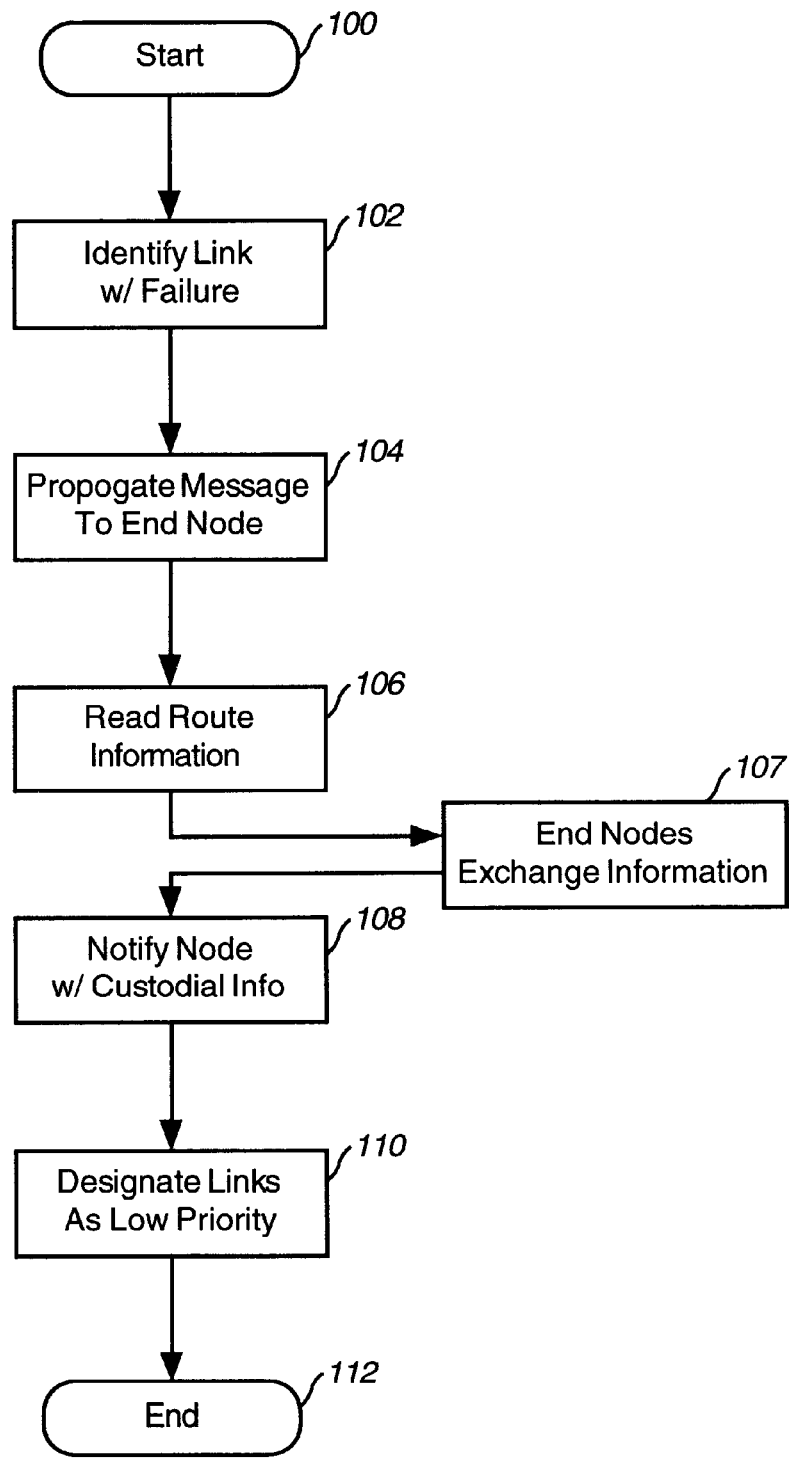
FIG. 3 is a flow chart of the propagation of a special message and route information.

Referring now to FIG. 3, a method or process is shown beginning at step 100. At step 102, the link that has the failure is identified. At step 104, the pair of custodial nodes that sandwich the failed link initiate the propagation of a message towards the end nodes, i.e., the origin node and the destination node. For the exemplar path at hand, assume that node 2 is the origin node and node 8 is the destination node. Further, the message may be referred to as a "reuse" message that has a variable length route information field and an identifier that identifies it as a reuse message. As the reuse message is propagated by the custodial nodes to their respective adjacent nodes and from those adjacent nodes further downstream to their respective adjacent nodes until it finally reaches the end nodes, each node through which the reuse message passes appends its own unique node identification (ID) to the route information field of the reuse message. At step 106, when the end node receives the reuse message, it can read from the route information field of the reuse message a description of the intact portions of the failed path.

Thus, in receipt of the reuse message, each end node, for example nodes 2 and 8, can extract from the reuse message the identities of all of the nodes that the message has passed through, and particularly the identities of the custodial nodes of the failed link, such as for example nodes 4 and 12. At step 107, the end nodes exchange information about the respective custodial nodes that each end node identified using the WAN 26. Thereafter, one or both of the end nodes can send information in the form of a message to each of the custodial nodes about adjacent custodial nodes via either the working path or the WAN 26.

In an alternate embodiment, after exchanging custodial node information with the other end node, each of the two end nodes of the failed path could inform the custodial node of the failed link closest to that custodial node as well as the custodial node's opposing custodial node. Consider the pair of custodial nodes 4 and 12 and link 4-12. End node 8, having extracted the information from the reuse message, now can inform custodial node 12, which is close to end node 8, that its opposing custodial node is node 4. Since custodial node 4 is closer to end node 2 than end node 8, end node 2 would inform custodial node 4 that its opposing custodial node is node 12. Given that information, custodial nodes 4 and 12 can each designate functioning link 124 a low quality link that should be avoided, if at all possible. The use of this alternative embodiment shortens the time taken to inform each node of the custodial pair of nodes, which sandwich a failed link, of its opposing custodial node.

In another alternative embodiment, one of the end nodes could also be a custodial node. For example, referring to FIG. 2, node 4 and node 8 become the end nodes with the fault 40 being the exemplar fault or break in the link 4-12.

In yet another alternative embodiment of the present invention, referring again to FIG. 2, consider the situation in which nodes 4 and 12 are the end nodes. Thus, taking the fault 40, the end nodes 4 and 12 are also the custodial nodes for the failed link 4-12. Accordingly, there is no need to propagate a message from the custodial node to the end node in this example because the end node are the custodial nodes. Therefore, end/custodial node 4 would communicate its identity to end/custodial node 12 and thereby the information is exchanged between the end nodes at the same time that the information is delivered each of the custodial nodes about the respective or adjacent custodial node.

Thus, having fully described the present invention by way of example with reference to attached drawings figures, it will be readily appreciated that many changes and modifications may be made to the invention and to any of the exemplary embodiments shown and/or described herein without departing from the spirit or scope of the invention, which is defined in the appended claims.

What is claimed is:

1. In a telecommunications network provisioned with a distributed restoration algorithm and having a plurality of nodes interconnected with links to form at least one path, a method of identifying functioning links associated with a failed link, comprising the steps of:

identifying the failed link;

propagating a message to a first end node of the path;

extracting from the message received at the first end node the identity of a first custodial node of the failed link;

communicating the identity of the first custodial node to a second end node via a communications network independent of the telecommunications network;

communicating the identity of a second custodial node to the first custodial node; and designating any functioning link parallel to the failed link connecting the first and second custodial nodes as a low quality link.

2. Method of claim 1, wherein the step of designating further comprises the step of:

using the low quality link for restoring traffic disrupted due to the failed link only if no alternative path is found for rerouting the disrupted traffic.

3. Method of claim 1, wherein the message is a reuse message comprising:

a header for identifying the message; and route information comprising identification of each node that the reuse message traverses through.

4. Method of claim 1, further comprising the step of providing an operation support system for monitoring and receiving the status of each node of the network.

5. Method of claim 1, further comprising the step of communicating the identity of the second custodial node to the first custodial node via the communications network.

6. In a distributed restoration algorithm provisioned telecommunications network having a plurality of nodes interconnected with links to form at least one path, a method of identifying functioning links associated with a failed link, comprising the steps of:

identifying the failed link;

propagating a first and second message to a first and second end node, respectively, of the path;

extracting from the first and second message received at the first and second end nodes the identity of a first and second custodial nodes, respectively, of the failed link;

exchanging information between the first and second end nodes relating to the identity of the first and second custodial nodes using a communications network independent of the telecommunications network;

communicating to the first and second custodial nodes the identity of the second and first custodial nodes, respectively; and designating any functioning link parallel to the failed link connecting the first and second custodial nodes as a low quality link.

7. Method of claim 6, wherein the step of designating further comprises the step of using the low quality link for restoring traffic disrupted due to the failed link only if no alternative path is found for rerouting the disrupted traffic.

8. Method of claim 6, wherein the message is a reuse message comprising a header for identifying the message as a reuse message and at least one variable length route information field whereinto the identification of each node that the reuse message traverses through is added.

9. Method of claim 6, further comprising the step of providing an operation support system for monitoring and receiving the status of each node of the network.

10. Method of claim 6, wherein the step of communicating is performed by one of the end nodes sending the identities of the respective custodial nodes to the corresponding custodial nodes via the communications network.

11. Method of claim 6, wherein the step of communicating comprises the steps of: sending node the identity of the second custodial node from the first end node to the first custodial node; and sending the identity of the first custodial node from the second end node to the second custodial node.

12. Method of claim 6, wherein the step of communicating comprises the steps of:

sending the identity of the first custodial node from the first end node to the second custodial node via the communications network; and sending the identity of the second custodial node from the second end node to the first custodial node via the communications network.

13. In a distributed restoration algorithm provisioned telecommunications network having a plurality of nodes interconnected with links to form at least one path interconnected by a number of the nodes extending across the telecommunications network, the path defined by a first and second end node, a method of identifying any functioning link that connects a first custodial node and a second custodial node that sandwich a failed link along the path, comprising the steps of:

at each end node extracting from a first and second message received there at the respective identities of the pair of custodial nodes sandwiching the failed link;

communicating from the first end node to the first custodial node the identity of the second custodial node;

communicating from the second end node to the second custodial node the identity of the first custodial node; and designating any functioning link parallel to the failed link connecting the first custodial node to the second custodial node as a low quality link.

14. Method of claim 13, wherein the step of communicating comprising the step of communicating from the end node to its closest custodial node the identity of the other custodial node.

15. Method of claim 13, further comprising the step of using the low quality link for restoring traffic disrupted due to the failed link only if no alternative path is found for rerouting the disrupted traffic.

16. Method of claim 13, wherein the message is a reuse message comprising: a header for identifying it as a reuse message; and at least one variable length route information field whereinto the identification of at least one node that the reuse message traverses through is added.

17. Method of claim 13, further comprising the step of:

providing an operation support system for monitoring and receiving the status of each node of the network.

18. Method of claim 13, further comprising the steps of:

providing a communications network independent of the telecommunications network; and communicating the identities of the respective custodial nodes from the end nodes to the corresponding custodial nodes via the communications network.

19. In a distributed restoration algorithm provisioned telecommunications network having a plurality of nodes interconnected with links to form a path defined by a first and second end node, a method of identifying any functioning link that connects a first and second custodial node that sandwich a failed link along the path, wherein the first and second end node correspond to the first and second custodial node, respectively, the method comprising the steps of:

identifying the failed link;

communicating the identity of the first custodial node from the first end node to the second custodial node via a communications network independent of the telecommunications network;

communicating the identity of the second custodial node from the second end node to the first custodial node via the communications network; and designating any functioning link parallel to the failed link connecting the first and second custodial nodes as a low quality link.

* * * * *